(12) United States Patent
Cheng

(10) Patent No.: US 7,213,241 B2
(45) Date of Patent: May 1, 2007

(54) METHODS AND APPARATUS FOR DISPATCHING JAVA™ SOFTWARE AS AN APPLICATION MANAGED BY AN OPERATING SYSTEM CONTROL MANAGER

(75) Inventor: Heung-For Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 571 days.

(21) Appl. No.: 10/187,921

(22) Filed: Jul. 2, 2002

(65) Prior Publication Data

US 2004/0006632 A1    Jan. 8, 2004

(51) Int. Cl.
*G06F 9/45* (2006.01)
*G06F 9/44* (2006.01)

(52) U.S. Cl. ..................... 717/148; 717/127
(58) Field of Classification Search ............. 717/121, 717/127, 118, 174, 148
See application file for complete search history.

(56) References Cited

U.S. PATENT DOCUMENTS 6,513,158 B1 *  1/2003  Yogaratnam ............... 717/166
6,711,739 B1 *  3/2004  Kutcher ...................... 718/1

OTHER PUBLICATIONS

"Java Deployment with JNLP and Webstart", by Mauro Marinilli, Sep. 19, 2001, ISBN:0-672-32182-3, excerpt from Chapter 8 & 9.*
"Microsoft SQL Server 2000 Administrator's Companion", M. F. Garcia, J. Reding, E. Whalen, S. Adrien, 2000. ISBN-0-7356-1051-7, excerpt for Figure 8-3 and Figure 8-4.*
"Running a Java 2 Application as an NT Service", by Bill Giel, Aug. 25, 2000.*
"Multiprocess JVMS", http://www.onjava.com/lpt/a/1201, available on Jun. 1, 2006.*
Czajkowski, "Application Isolation in the Java™ Virtual Machine," (ACM OOPSLA 2000).
Czajkowski, et al. "Automated and Portable Native Code Isolation," (Sun Labs Technical Report 2001).
Daynes, et al. "High-Performance, Space-efficient, Automated Object Locking," (IEEE ICDE 2001).
Czajkowski, et al. "Multitaskig Without Compromise: A Virtual Machine Evolution," (ACM OOPSLA 2001).
Czajkowski, et al. "Code Sharing Among Virtual Machines," (ECOOP 2002).
Oaks, et al. "O'Reilly Online Catalog, Java Threads, 2nd Edition, Chapter 1. Introduction to Threading" (1999).
Liang, et al. "Dynamic Class Loading in the Java™ Virtual Machine," (ACM OOPSLA 1998).
Java™ Network Launching Protocol & API Specification (JSR-56), Version 1.5 (2001).

* cited by examiner

*Primary Examiner*—Wei Zhen
*Assistant Examiner*—Philip Wang
(74) *Attorney, Agent, or Firm*—Marshall, Gerstein & Borun LLP

(57) ABSTRACT

Methods and apparatus for controlling operating system independent applications are disclosed. For example, a low-level service application is provided for use in a computer having a processor executing an operating system. The example universal interface is adapted to launch a virtual machine and an application controller executed by the virtual machine. The application controller is adapted to monitor a configuration file and spawn a virtual machine thread in response to data contained in the configuration file to launch multiple operating system independent application programs within the same virtual machine.

30 Claims, 6 Drawing Sheets

FIG. 6
600

```
class JavaApp1 extends Thread
{
        //Java class constructor catches the parameters and stores them
    public JavaApp1(<type1> <parameter1>, ..., <typeN> <parameterN>) {
        ...
    }

//This method is the task the Java Class wants to perform
    public void run() {
        ...
    }
}
```

FIG. 7
700

```
public class JavaThreadDispatcher
{
...
        private static Thread thread 1 = null;
                //declare a thread1 variable as a thread
        public static void main (String[ ] args) {
            ....
            thread1 = new JavaApp1 (<parameter1>, ..., <parameterN>);
                    //create a thread to run the JavaApp 1 class
            thread1.start();
                    //start() is a method in "Thread" class. When it is
                         called, it will run the "run" method of JavaApp1
class
            ...
            thread1.stop();
                    //stop() is a method in "Thread" class. When it is
                         called, it will stop the thread
            thread1 = null;
                    //reinitialize the variable to NULL
            ...
}
```

METHODS AND APPARATUS FOR DISPATCHING JAVA™ SOFTWARE AS AN APPLICATION MANAGED BY AN OPERATING SYSTEM CONTROL MANAGER

TECHNICAL FIELD

The present disclosure relates to computer software and, more particularly, to methods and an apparatus for dispatching Java™ software as an application managed by an operating system control manager.

BACKGROUND

Java™ is a cross-platform programming language used to develop applications particularly well suited to run in an Internet browser, or as a stand-alone application program that runs on a local machine operating system. Java™ programs are typically operating system independent, meaning they may be executed on a number of different operating systems including, for example, Microsoft Windows®, Linux, Netware, Mac OS, etc. The ability to execute on a number of different operating systems has lead to an increase in the number of applications developed in the Java™ language. Thus, the effective management of computer resources allocated to the execution of Java™ applications has increased in importance.

When operating in the Windows® environment, it is often desirable to execute certain Java™ applications as a background Windows® service. A Windows® service is a program, routine, or process that performs a specific system function to support other programs, particularly at a low (close to the hardware) level (e.g., the Security Accounts Manager service, the file replication service, or the routing and remote access service). A Java™ application, however, cannot be run as a Windows® service directly. In order to run the Java™ application as a Windows® service, the Java™ Software Developers Kit (SDK) provides a Java™ Native Interface library so that a C or C++ Windows® service application may be written to invoke the Application Programming Interfaces (APIs) necessary to execute a Java™ Virtual Machine (JVM) to load the Java™ application at the low level desired.

As will be readily appreciated, a great deal of time and knowledge is required in order to write a C or C++ Windows® service application. For example, a programmer must be familiar not only with Java, but also C or C++ and more importantly, a number of Windows® APIs. In addition, the programmer must be familiar enough with Windows® so as to set specific system environment variables, such as the CLASSPATH environment variable, to allow the Java™ application to operate properly. Moreover, a single virtual machine must be invoked for each Java™ application initiated, quickly leading to degradation in system performance and memory capacity.

BRIEF DESCRIPTION OF THE DRAWINGS

FIG. 6 is example pseudo-Java™ code which may be utilized in programming a Java™ application utilized in the program of FIGS. 3 and 4.

FIG. 7 is example pseudo-Java™ code which may be utilized in programming an application controller utilized in the program of FIGS. 3 and 4.

DETAILED DESCRIPTION

Figure 1:
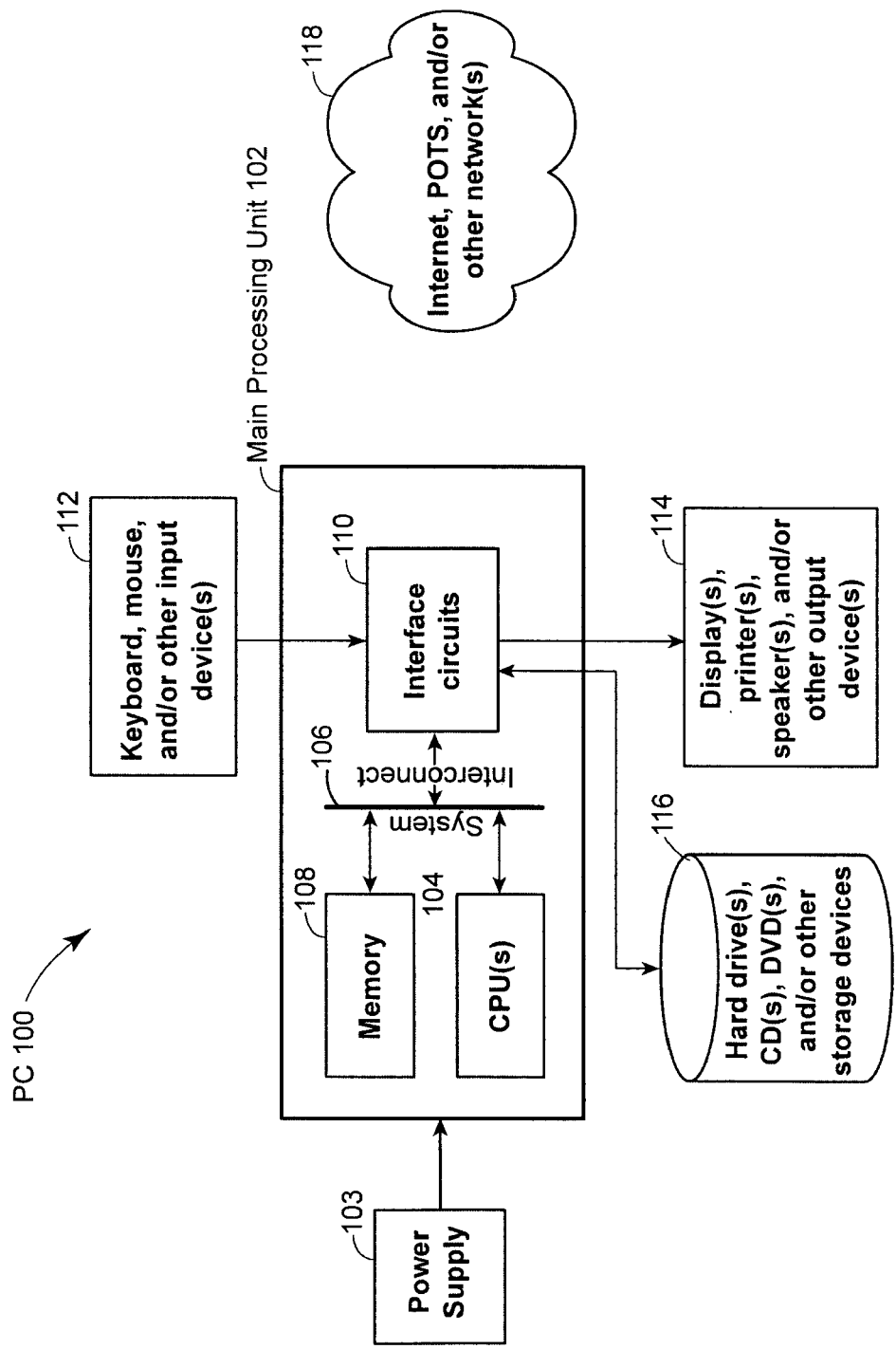
FIG. 1 is a block diagram of a computer system illustrating an example environment of use for the disclosed methods and apparatus.

A block diagram of an example computer system 100 is illustrated in FIG. 1. The computer system 100 may be a personal computer (PC) or any other computing device capable of executing a software program. In an example, the computer system 100 includes a main processing unit 102 powered by a power supply 103. The main processing unit 102 illustrated in FIG. 1 includes one or more central processing units (CPUs) 104 electrically coupled by a system interconnect 106 to one or more memory device(s) 108 and one or more interface circuits 110. In an example, the system interconnect 106 is an address/data bus. Of course, a person of ordinary skill in the art will readily appreciate that interconnects other than busses may be used to connect the CPU(s) 104 to the memory device(s) 108. For example, one or more dedicated lines and/or a crossbar may be used to connect the CPU(s) 104 to the memory device(s) 108.

The CPU(s) 104 may include any type of well known microprocessor, such as a microprocessor from the Intel Pentium™ family of microprocessors, the Intel Itanium™ family of microprocessors, and/or the Intel XScale™ family of processors. The illustrated main memory device 108 includes random access memory such as, for example, dynamic random access memory (DRAM), but may also include nonvolatile memory. In an example, the memory device(s) 108 store a software program which is executed by one or more of the CPU(s) 104 in a well known manner.

The interface circuit(s) 110 are implemented using any type of well known interface standard, such as an Ethernet interface and/or a Universal Serial Bus (USB) interface. In the illustrated example, one or more input devices 112 are connected to the interface circuits 110 for entering data and commands into the main processing unit 102. For example, an input device 112 may be a keyboard, mouse, touch screen, track pad, track ball, isopoint, and/or a voice recognition system.

In the illustrated example, one or more displays, printers, speakers, and/or other output devices 114 are also connected to the main processing unit 102 via one or more of the interface circuits 110. The display 114 may be a cathode ray tube (CRT), a liquid crystal display (LCD), or any other type of display. The display 114 may generate visual indications of data generated during operation of the main processing unit 102. For example, the visual indications may include prompts for human operator input, calculated values, detected data, etc.

The illustrated computer system 100 also includes one or more storage devices 116. For example, the computer system 100 may include one or more hard drives, a compact disk (CD) drive, a digital versatile disk drive (DVD), and/or other computer media input/output (I/O) devices.

The illustrated computer system 100 also exchanges data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
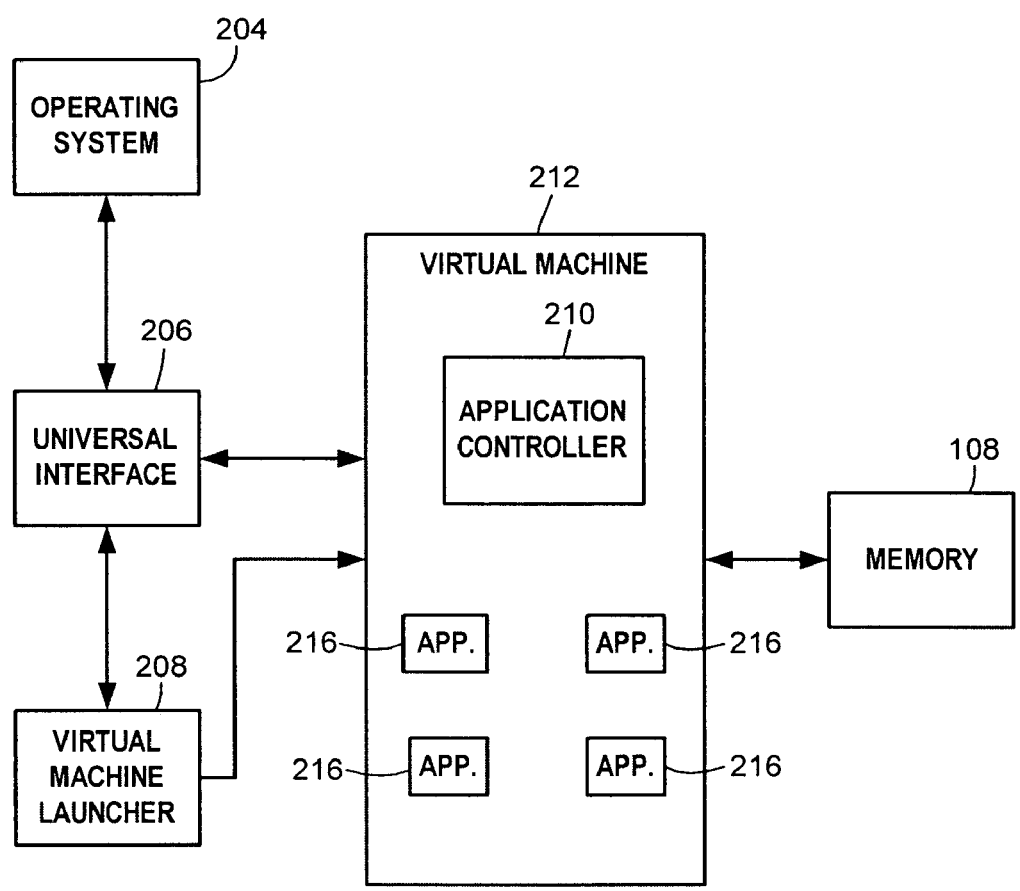
FIG. 2 is a block diagram of an example apparatus for dispatching Java™ software as an application managed by an operating system control manager.

An example apparatus for dispatching Java™ software as an application managed by an operating system control manager is illustrated in FIG. 2. Preferably, the apparatus includes, an operating system 204, a universal interface 206, a virtual machine launcher 208, an application controller 210, a virtual machine 212 and the memory device(s) 108. Any or all of the universal interface 206, the virtual machine launcher 208, and the application controller 210 may be implemented by conventional electronic circuitry, firmware, and/or by a microprocessor executing software instructions in a well known manner. However, in the illustrated example, the universal interface 206, the virtual machine launcher 208, and the application controller 210 are implemented by software executed by the CPU 104. The memory device(s) 108 may be implemented by any type of memory device including, but not limited to, dynamic random access memory (DRAM), static random access memory (SRAM), and/or non-volatile memory. In addition, a person of ordinary skill in the art will readily appreciate that certain modules in the apparatus shown in FIG. 2 may be combined or divided according to customary design constraints. Still further, one or more of the modules may be located external to the main processing unit 102.

In the illustrated example, the operating system 204 is stored and executed on the CPU 104. The operating system may be, for example, Microsoft Windows® NT 3.51, NT 4.0, Windows 2000, Windows XP, or Windows .NET, marketed by Microsoft Corporation, of Redmond, Wash. The operating system 204 is adapted to execute an operating system service (e.g., a Windows® service) which is a program, routine, or process that performs a specific system function to support other programs, particularly at a low (close to the hardware) level.

In the illustrated example, the universal interface 206 is a dispatcher service executed on the operating system 204. The universal interface 206 is universal in that it is the interface between the operating system 204, and multiple operating system independent application programs as will be described in detail hereinafter. The universal interface 206 is preferably written in the C programming language, however, it may be written in any high level language, such as C++, or the like, or any low-level, assembly or machine language.

The illustrated universal interface 206 initiates the virtual machine launcher 208 which invokes an operating system thread to run a virtual machine 212. In the illustrated example, the virtual machine launcher 208 invokes a Windows® thread to create a Windows® virtual machine 212. A thread is placeholder information associated with a single use of a program that can handle multiple concurrent processes. In other words, a thread is the information needed for the operating system to serve one individual process or a particular service request. A virtual machine is software that acts as an interface between Java code and the hardware platform.

Once the virtual machine 212 has been invoked, any Java™ application program may be executed by the operating system 204 within that virtual machine. In the illustrated example, the virtual machine 212 is the Java™ Virtual Machine for Windows® provided by different Java™ Runtime Environment (JRE) vendors.

The universal interface 206 also initiates the application controller 210 which is executed within the virtual machine 212 and is adapted to coordinate the "start" and "stop" application requests governing initiation and closing of operating system independent application programs within the virtual machine 212. Specifically, the application controller 210 is programmed to dynamically start and stop specific operating system independent application programs 216 (e.g., Java™ applications), stored in the memory device(s) 108 and executed by the virtual machine 212. By coordinating and dynamically starting and stopping the application programs 216, the application controller 210 is able to execute multiple concurrent application programs 216 within the same virtual machine 212. The application controller 210 is preferably written in the Java™ programming language. However, it may be written in any operating system independent programming language.

An example manner in which the system of FIG. 2 may be implemented is described below in connection with a number of flow charts which represent portions or routines of one or more computer programs. These computer program portions are stored on a tangible medium, such as in one or more of the memory device(s) 108 and executed by the CPU 104.

Figure 3:
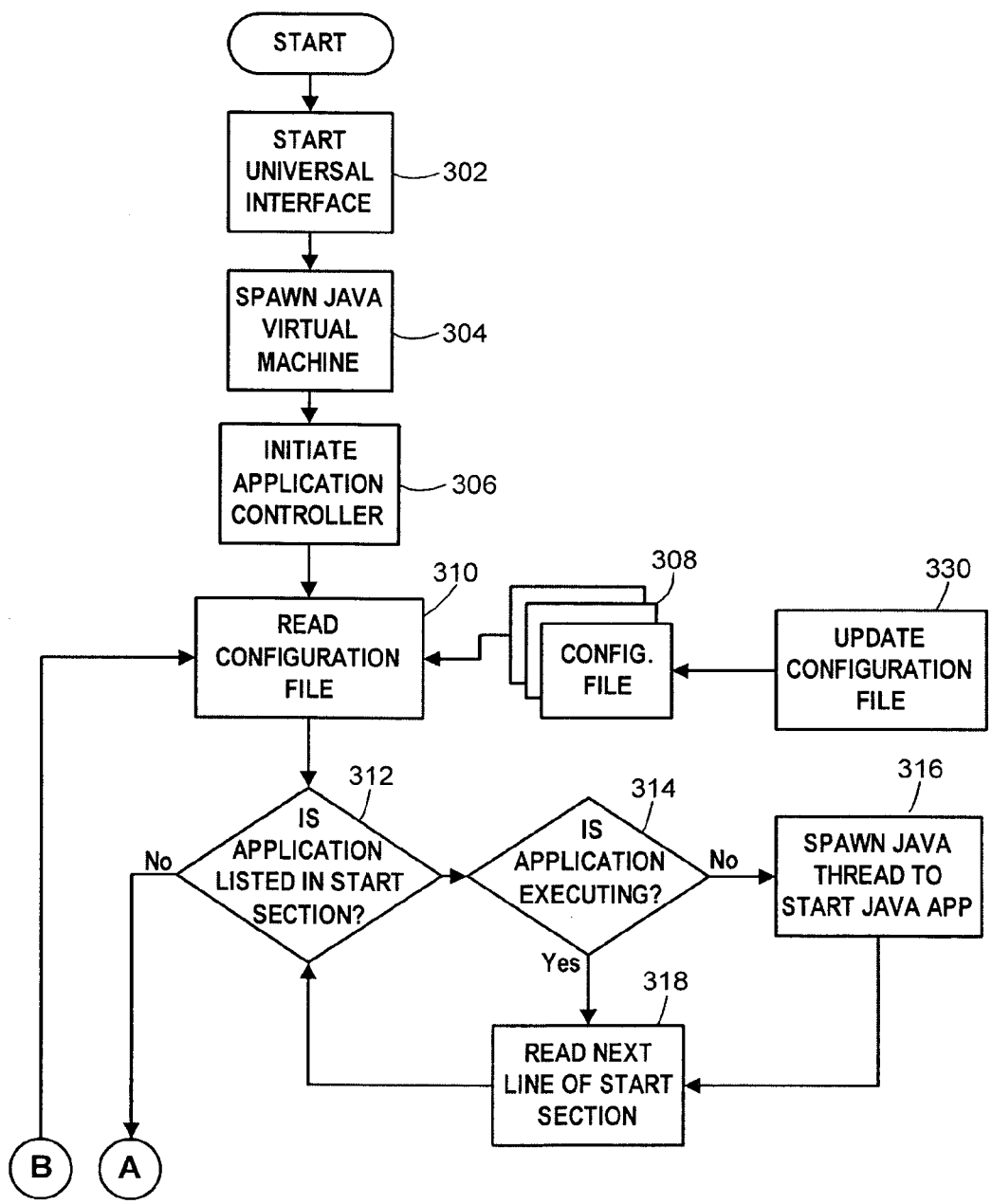
FIGS. 3 and 4, when joined along like alphanumeric characters, together are a flowchart of an example program executed by the main processing unit of FIG. 1 to implement the apparatus of FIG. 2.
Figure 4:
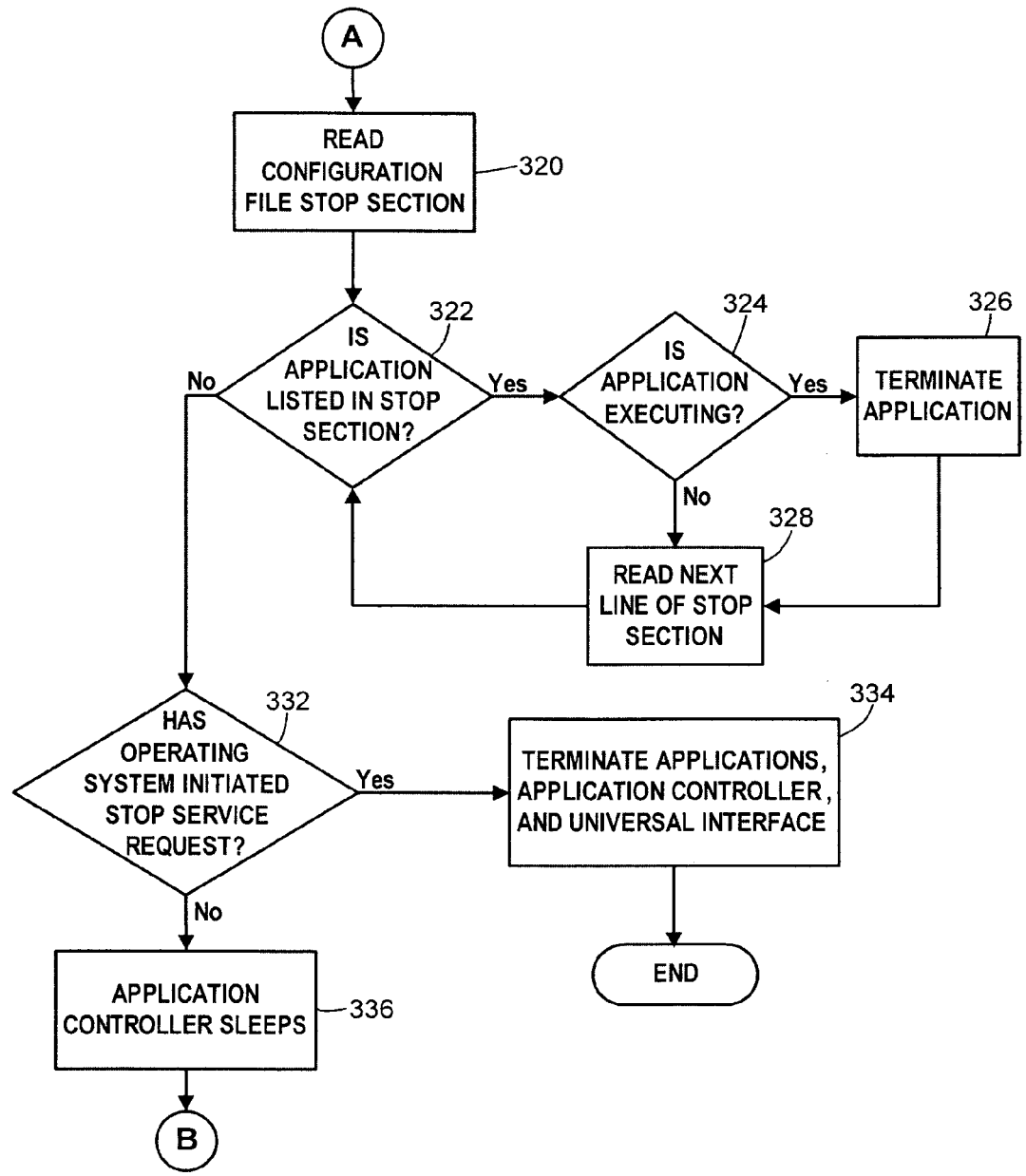

An example program for dispatching Java™ applications is illustrated in FIGS. 3 and 4. Initially, the universal interface 206, (also known as a "Dispatcher Service") is started as a Windows® service (block 302). Once started, the universal interface 206 spawns a Windows® thread which invokes a virtual machine 212 (block 304). The universal interface 206 spawns the virtual machine 212 by initiating the proper Application Programming Interfaces (APIs) provided with the Java™ Software Developers Kit (SDK), utilizing the Java™ Native Interface library all of which are components of the virtual machine.

The universal interface 206 will then initiate the application controller 210 (also known as a "Java Thread Dispatcher") which is executed by the virtual machine 212 (block 306). As previously mentioned, the application controller 210 is programmed to coordinate all "start" and "stop" application requests. For example, upon recognition of a "start" request, the application controller 210 will spawn a Java™ thread within the virtual machine 212 to execute the requested application 216. A separate Java™ thread is spawned for each requested application and each application is separately executed within the virtual machine 212. To direct the stopping and starting of the applications 216, the application controller 210 utilizes a configuration file 308 (e.g., a list of applications 216) as described below (block 310).

Figure 5:
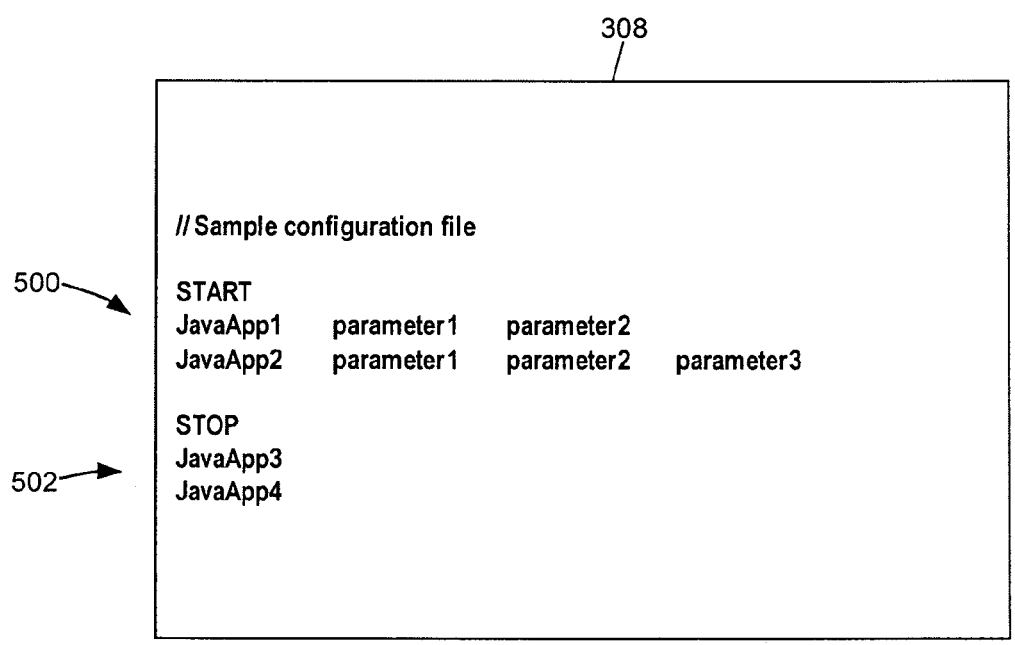
FIG. 5 is a sample configuration file which may be utilized in the program of FIGS. 3 and 4.

A sample configuration file 308 is illustrated in FIG. 5. In the illustrated example, the configuration file 308 contains two main operating sections. The first operating section is the start section 500, which lists the applications 216, including the required operating parameters, to be initiated by the application controller 210. The second operating section is the stop section 502, which lists the applications 216 to be terminated by the application controller 210. It will be appreciated by those of ordinary skill in the art that the configuration file 308, may contain any number of alternative sections, and it may furthermore be stored in a number of different formats, including, for example, in a relational database table. The configuration file 308 is periodically updated by a user or a user program executing on the operating system 204 as the need to run new application(s) and to stop executing application(s) arises.

Returning once again to FIGS. 3 and 4, the application controller 210 reads the configuration file 308 (block 310) to determine whether there are any applications 216 to be started in the virtual machine 212. Specifically, the application controller 210 reads the configuration file 308 and then determines if an application 216 is listed in the start section 500 (block 312). If the application controller 210 determines that an application 216 is listed in the start section 500, the application controller 210 identifies whether the identified application 216 is currently executing within the virtual machine 212 (block 314). For example, the application controller 210 may poll the active threads within the virtual machine 212 to see if the identified application 216 is being executed.

If the identified application 216 is not being executed by the virtual machine 212, the application controller 210 spawns a thread within the virtual machine 212 to execute the identified application 216 within that virtual machine 212 (block 316). If the identified application 216 is being executed, or once the application controller 210 spawns the virtual machine thread (e.g., starting the application), the application controller 210 reads the next line of the start section 500 of the configuration file 308 (block 318) and determines whether there is an application listed in the start section 500 (block 312), thereby repeating the start processing.

After starting all the identified applications 216 (block 312), the application controller 210 reads the configuration file 308 (FIG. 4, block 320) to determine whether there are any applications 216 executing in the virtual machine 212 which must be stopped. Specifically, the application controller 210 reads the configuration file 308 and determines if an application 216 is listed in the stop section 502 (block 322). If the application controller 210 determines that an application 216 is listed in the stop section 502, the application controller 210 polls the active threads executing within the virtual machine 212 to see if the identified application 216 is being executed (block 324).

If the identified application 216 is being executed by the virtual machine 212, the application controller 210 terminates the appropriate thread within the virtual machine 212 to stop the identified application 216 (block 326). If the identified application 216 is not being executed, or once the application controller 210 terminates the appropriate virtual machine thread, the application controller 210 reads the next line of the stop section 502 of the configuration file 308 (block 328) and determines whether there is an application listed in the stop section 502 (block 322), thereby repeating the termination process.

As mentioned above, throughout the processing, the configuration file 308 may be dynamically updated to start new applications 216, or stop existing applications as desired (FIG. 3, block 330). For example, in order to stop all applications 216, the configuration file 308 may be updated to list all applications 216 in the stop section 502. In this manner, all applications 216 are terminated. In such circumstances, the universal controller 206 and the application controller 210 continue to be executed by the operating system 204. Alternatively, the universal interface 206 (and consequently the application controller 210) may also be stopped directly via a service stop request initiated by the operating system (block 332). In the illustrated example, the operating system service stop request is initiated by the Windows® Service Control Manager. The service stop request terminates the execution of each application 216, the application controller 210 and the universal controller 206 (block 334).

If there has been no service stop request, the application controller 210 "sleeps" for a predetermined time (block 336). In other words, the application controller 210 executes a predetermined delay routine before reading the configuration file 308 again. Once the delay routine is completed, the application controller 210 will read the configuration file 308 (FIG. 3, block 310) and start and stop the appropriate applications as described hereinbefore.

Turning to FIGS. 6 and 7, there are illustrated two examples of pseudo-Java™ code which may be used in conjunction with a sample application controller 700 described below. Specifically, as shown in FIG. 6, a Java Class 600 is shown. The Java Class 600 for an application "JavaAppl" is defined as a subclass of the "Thread" class through the "extends" keyword in the class definition. The Java Class 600 constructor will catch the parameters required and save them in the internal variables for later use. The Java Class 600 also provides a run method for performing specific programming tasks as desired.

Turning to FIG. 7, the sample application controller 700 is illustrated. As shown, the sample application controller 700 contains an example of Java™ code which may first initialize and spawn a thread to run the Java Class 600, or in this example, the JavaAppl class. The Java™ code may then initiate the start( ) method of the thread variable (e.g., thread1.start( )) to execute the run method detailed in the Java Class 600. The code may also provide a stop( ) method to terminate execution of the Java Class 600. Finally, the thread is terminated by initiating the thread variable to NULL.

Although certain examples have been disclosed and described herein in accordance with the teachings of the present invention, the scope of coverage of this patent is not limited thereto. On the contrary, this patent covers all embodiments of the teachings of the invention fairly falling within the scope of the appended claims, either literally or under the doctrine of equivalents.

What is claimed is:

1. A method for dispatching multiple software applications as threads executed by an operating system comprising:

initializing a universal interface program as a low-level operating system service executable;

launching an operating system virtual machine, wherein the virtual machine is adapted to simultaneously execute multiple operating system independent application programs; and initializing an application controller within the operating system virtual machine, wherein, during execution of the low-level system service executable, the application controller is adapted to read configuration data and to respond to the configuration data by spawning virtual machine threads within the virtual machine to execute each of the operating system independent application programs identified by the configuration data in a different spawned thread of the virtual machine;

wherein the application controller is further adapted to periodically re-read the configuration data during the execution of the operating system independent application programs; and wherein the application controller is further adapted to respond to the configuration data by selectively starting or stopping at least one of the operating system independent application programs after stopping or starting a respective one of the at least one operating system independent application programs.

2. A method as defined in claim 1, wherein the universal interface program comprises a C or C++ program.

3. A method as defined in claim 1, wherein the operating system is Microsoft Windows®, and wherein initializing the universal interface program comprises initializing the universal interface program as a Windows® service.

4. A method as defined in claim 1, wherein the multiple operating system independent application programs are Java™ application programs.

5. A method as defined in claim 4, wherein the operating system is Microsoft Windows®, and wherein initializing the universal interface program comprises initializing the universal interface program as a Windows® service.

6. A method as defined in claim 5, wherein initializing the universal interface program further comprises initializing a C or C++ program as a Windows® service.

7. A method as defined in claim 1, wherein the configuration data is stored on a computer readable medium and wherein the application controller retrieves the configuration data into a computer memory.

8. A method as defined in claim 7, wherein the configuration data is dynamically updatable.

9. A method as defined in claim 1, wherein the application controller is further adapted to respond to configuration data regarding the operating system independent application programs to terminate the virtual machine threads within the virtual machine to stop the operating system independent application programs identified by the configuration data.

10. A method for dispatching Java™ software applications as virtual machine threads managed by a Windows® operating system control manager comprising:
    initializing a universal interface program as a Windows® service;
    launching a Windows® virtual machine from the universal interface program, wherein the virtual machine is adapted to execute multiple Java™ application programs; and
    initializing an application controller within the Windows® virtual machine, wherein the application controller is adapted to read a configuration file containing configuration data regarding the Java™ application programs, the application controller further adapted to respond to the configuration data by spawning Windows® virtual machine threads to execute within the Windows® virtual machine the Java™ application programs identified by the configuration data;
    wherein each Java™ application program executes in a different spawned thread of the virtual machine;
    wherein the application controller is further adapted to periodically re-read the configuration file during execution of the Java™ application programs; and
    wherein the application controller is further adapted to respond to the configuration data by selectively starting or stopping at least one of the Java™ application programs after stopping or starting a respective one of the at least one Java™ application programs.

11. A method as defined in claim 10, wherein initializing the universal interface program comprises initializing a C or C++ program as the Windows® service.

12. A method as defined in claim 10, wherein the configuration data is stored on a computer readable medium and retrieved into a computer memory.

13. A method as defined in claim 12, wherein the configuration data is dynamically updatable.

14. A method as defined in claim 12, wherein the application controller is further adapted to respond to the configuration data regarding the Java™ application programs to terminate the Windows® virtual machine threads to stop the Java™ application programs identified by the configuration data.

15. A computing apparatus comprising:
    a universal interface initialized as an operating system service, the universal interface responsive to an operating system to initiate a virtual machine adapted to simultaneously execute multiple operating system independent application programs;
    a configuration data file storing data regarding the operating system independent application programs; and
    an application controller configured to execute within the virtual machine, the application controller further configured to spawn a first virtual machine thread within the virtual machine in response to reading the data within the configuration data file, the first virtual machine thread to execute a first operating system independent application program within the virtual machine, the application controller further configured to spawn a second virtual machine thread within the virtual machine in response to reading the data within the configuration data file, the second virtual machine thread to execute a second operating system independent application program within the virtual machine;
    wherein the application controller is further adapted to periodically re-read the configuration data file during execution of the first and second operating system independent application programs; and
    wherein the application controller is further adapted to respond to the configuration data by selectively starting or stopping at least one of the first and second operating system independent application programs after stopping or starting a respective one of the first and second operating system independent application programs.

16. An apparatus as defined in claim 15, wherein the application controller monitors the configuration data file for updated data regarding the operating system independent application programs.

17. An apparatus as defined in claim 15, wherein the operating system is Microsoft Windows® and wherein the universal interface is a program initialized as a Windows® service.

18. An apparatus as defined in claim 17, wherein the operating system independent application programs are Java™ application programs.

19. A computer program stored on a tangible storage medium and executable on an operating system comprising:
    a first software initializable as a low-level operating system executable, the first software adapted to initiate an operating system virtual machine; and
    a second software initializable as a virtual machine thread executing within the operating system virtual machine, the second software responsive to configuration data stored on a computer readable medium to individually control multiple virtual machine threads to start or stop multiple operating system independent application programs within the operating system virtual machine;
    wherein the second software is adapted to periodically re-read the configuration data during the execution of the operating system independent application programs; and
    wherein the second software further adapted to respond to the configuration data by selectively starting or stopping at least one of the operating system independent application programs after stopping or starting a respective one of the at least one operating system independent application programs.

20. A computer program as defined in claim 19, wherein the operating system is Microsoft Windows®.

21. A computer program as defined in claim 20, wherein the first software is initializable as a Windows® service.

22. A computer program as defined in claim 20, wherein the operating system independent application programs are Java™ applications.

23. A computing apparatus comprising:
- an input device;
- an output device;
- a memory; and
- a processor cooperating with the input device, the output device and the memory to initiate a virtual machine and to execute an application controller within the virtual machine for controlling simultaneous execution of a first operating system independent application within the virtual machine and a second operating system independent application within the virtual machine by reading configuration data to selectively create and terminate at least one of a first and second virtual machine thread within the virtual machine thereby selectively starting and stopping a respective one of the first and second operating system independent applications;
- wherein the application controller is further adapted to periodically re-read the configuration data during the execution of the operating system independent application programs.

24. An apparatus as defined in claim 23, further comprising a universal interface executing on the processor to initiate the virtual machine.

25. An apparatus as defined in claim 23, further comprising:
- a configuration data file stored in the memory data regarding the operating system independent application programs.

26. An apparatus as defined in claim 25, further comprising:
- an application controller to spawn a first virtual machine thread within the virtual machine to execute a first operating system independent application program and to spawn a second virtual machine thread within the virtual machine to execute a second operating system independent application program in response to data stored in the configuration data file.

27. An apparatus as defined in claim 23, wherein the operating system independent applications are Java™ applications.

28. A method of executing Java™ applications comprising:
- initiating a virtual machine;
- initiating an application controller within the virtual machine;
- executing a first Java™ application within the virtual machine with a first virtual machine thread; and
- executing a second Java™ application within the virtual machine with a second virtual machine thread while the first Java™ application is executing; and
- wherein the application controller is responsive to configuration data identifying the first and second Java™ application programs to selectively create and terminate the first and second virtual machine threads within the virtual machine thereby selectively starting and stopping the first and second Java™ application programs identified by the configuration data;
- wherein the second software is adapted to periodically re-read the configuration data during the execution of the operating system independent application programs.

29. A method as defined in claim 28, further comprising:
- executing a third Java™ application within the virtual machine.

30. A method as defined in claim 29, further comprising:
- terminating one of the first, second and third Java™ applications.

* * * * *